(12) United States Patent
Faenger

(10) Patent No.: US 8,970,733 B2
(45) Date of Patent: Mar. 3, 2015

(54) VISUAL PAIRING AND DATA EXCHANGE BETWEEN DEVICES USING BARCODES FOR DATA EXCHANGE WITH MOBILE NAVIGATION SYSTEMS

(75) Inventor: Jens Faenger, Santa Clara, CA (US)

(73) Assignee: Robert Bosch GmbH, Stuttgart (DE)

( * ) Notice: Subject to any disclaimer, the term of this patent is extended or adjusted under 35 U.S.C. 154(b) by 482 days.

(21) Appl. No.: 12/789,999

(22) Filed: May 28, 2010

(65) Prior Publication Data
US 2011/0295502 A1    Dec. 1, 2011

(51) Int. Cl.
| | |
|---|---|
| H04N 5/76 | (2006.01) |
| H04N 1/32 | (2006.01) |
| H04M 1/725 | (2006.01) |
| H04N 1/00 | (2006.01) |
| H04N 101/00 | (2006.01) |

(52) U.S. Cl.
CPC ......... *H04N 1/32106* (2013.01); *H04M 1/7253* (2013.01); *H04N 1/00307* (2013.01); *H04N 1/00326* (2013.01); *H04N 1/00328* (2013.01); *H04N 2101/00* (2013.01); *H04N 2201/0084* (2013.01); *H04N 2201/3225* (2013.01); *H04N 2201/3226* (2013.01); *H04N 2201/3269* (2013.01); *H04N 2201/3273* (2013.01)
USPC .................................................... 348/231.2

(58) Field of Classification Search
USPC .................................................... 348/231.2
See application file for complete search history.

(56) References Cited

U.S. PATENT DOCUMENTS

| | | | |
|---|---|---|---|
| 6,470,268 B1 | 10/2002 | Ashcraft | |
| 7,296,747 B2 | 11/2007 | Rohs | |
| 7,904,219 B1* | 3/2011 | Lowrey et al. | 701/32.3 |
| 2005/0099653 A1 | 5/2005 | Kawaoka | |
| 2006/0071076 A1 | 4/2006 | Tamayama | |
| 2006/0136129 A1* | 6/2006 | Yokozawa | 701/211 |
| 2007/0168488 A1* | 7/2007 | Deguchi et al. | 709/223 |
| 2007/0192189 A1* | 8/2007 | Popowich et al. | 705/14 |
| 2008/0267504 A1* | 10/2008 | Schloter et al. | 382/181 |
| 2009/0157530 A1* | 6/2009 | Nagamoto et al. | 705/27 |

(Continued)

FOREIGN PATENT DOCUMENTS

| | | |
|---|---|---|
| EP | 1551140 A1 | 7/2005 |
| EP | 1860822 A1 | 11/2007 |
| GB | 2451435 A | 4/2009 |

OTHER PUBLICATIONS

McCune J M et al; "Seeing-Is-Believing" Using Camera Phones for Human-Verifiable Authentication, Security and Privacy, 2005 IEEE Symposium on Oakland, CA, USA May 8-11, 2005, Piscataway, NJ, USA, IEEE, May 8, 2005, pp. 110-124, XP010798367, DOI:10.1109/SP.205.19; ISBN: 978-0-7695-2339-2.

(Continued)

*Primary Examiner* — James Trammell
*Assistant Examiner* — Michael D Lang
(74) *Attorney, Agent, or Firm* — Maginot Moore & Beck LLP

(57) ABSTRACT

A method of operating first and second electronic devices includes providing the first device with a display screen, and providing the second device with a camera. A tag is displayed on the screen. The tag is associated with information stored within the first device. An image of the tag is captured by use of the camera. The captured image is processed within the second device to thereby recognize the tag. In response to the recognition of the tag, the second device is used to initiate a transfer of the information to the second device.

25 Claims, 7 Drawing Sheets

(56) References Cited

U.S. PATENT DOCUMENTS

| | | | |
|---|---|---|---|
| 2009/0286479 A1 | 11/2009 | Thoresson | |
| 2010/0082491 A1* | 4/2010 | Rosenblatt et al. | 705/65 |
| 2010/0163613 A1* | 7/2010 | Bucher et al. | 235/375 |
| 2010/0174599 A1* | 7/2010 | Rosenblatt et al. | 705/14.37 |
| 2010/0179754 A1 | 7/2010 | Faenger | |
| 2011/0101086 A1* | 5/2011 | Yach | 235/375 |
| 2011/0140844 A1* | 6/2011 | McGuire et al. | 340/6.1 |
| 2011/0159916 A1* | 6/2011 | Boskovic | 455/556.1 |

OTHER PUBLICATIONS

Xu Liu et al: "VCode—Pervasive Data Transfer Using Video Barcode", IEEE Transactions on Multimedia, IEEE Service Center, Piscatawa, NJ, US, vol. 10, No. 3, Apr. 1, 2008, p. 361-371, XP011205645, ISSN: 1520-9210.

* cited by examiner

US 8,970,733 B2

VISUAL PAIRING AND DATA EXCHANGE BETWEEN DEVICES USING BARCODES FOR DATA EXCHANGE WITH MOBILE NAVIGATION SYSTEMS

BACKGROUND OF THE INVENTION

1. Field of the Invention

The present invention relates to methods of data transfer, and, more particularly, to methods of data transfer between mobile electronic devices.

2. Description of the Related Art

State of the art data exchange between two mobile devices such as cell phones or computers typically involves three steps: discovery, pairing and the data exchange itself. For each of the three steps, a range of possible approaches exists.

In the discovery step, it may be determined which devices are available to exchange data with another device. This discovery step may be easily demonstrated by use of Bluetooth devices, for example. In order for discovery in a Bluetooth device to work, one of the two devices has to be set into a "discoverable" mode. Afterwards, the other device can perform a search for Bluetooth devices that are within range. As a result, the other device may find all devices that are discoverable. Another approach is demonstrated by Apple's Bonjour technology, which enables finding computers in the same network.

The second of the above-mentioned three steps, "pairing", involves ensuring that it is intended that both devices exchange data with each other. For this authentication purpose, typically a password or a number, the "PIN," must be entered into both devices by a user. Only if both passwords match will both devices be allowed to become associated with each other, i.e., be allowed to exchange data with each other. Examples of this approach are demonstrated in Bluetooth or by Microsoft's HomeGroup Networking.

Once both devices are paired with each other, they are then able to exchange data with each other. This final one of the three above-mentioned steps can be realized by a range of traditional wireless or wired technologies. Typical examples for data exchange technologies are LAN, WiFi, Bluetooth, GSM/3G wireless networks, etc.

As demonstrated in U.S. Pat. No. 7,296,747, visual approaches can also be used to exchange data. Barcodes that are printed on or attached to physical objects can be used to link digital information with those objects. Cell phones and other mobile devices with a built-in camera can capture these two-dimensional barcodes in the same manner that they take photographs. Thus, there is no "barcode scanner" required. These two-dimensional barcodes contain encoded information such as text, internet URLs, SMS messages, business card information, phone numbers, email messages, etc. Decoding software on the mobile device is able to capture and decode the data and then present, store, manipulate, or take action based on the data. One such action is to open the mobile browser going to a web site.

In addition, U.S. Pat. No. 6,470,268 explains how to use bar codes for the purpose of driver navigation. Barcodes that are printed on a piece of paper are used to encode location information such as a geographical position. A bar code scanner in the navigation system is used to read, decode and input the location into the navigation system as a travel destination. Instead of manually entering a geographical position and/or address, the driver can merely scan the bar code that is on the piece of paper.

What is neither disclosed nor suggested by the prior art is a method of exchanging or transferring information between two mobile electronic devices that takes less user action and involvement than the known methods described above.

SUMMARY OF THE INVENTION

The present invention may enable two devices to exchange data with each other by use of a visual approach. A camera may be used to initiate and perform the data exchange. Both devices need only be held against each other (e.g., so that the devices are touching each other) in order to initiate the transfer. Thus, the process for the user is very intuitive, convenient and fast. The data transfer can then be performed with traditional wireless or wired technology such as Bluetooth or WiFi. In addition, the invention may support a visual or optical transfer of content. In this way, the complete communication between both devices can be done purely visually without involving any other transfer technology. Such a visual transmission of content may be beneficial in situations that require transmission of small amounts of information without the overhead of establishing a connection between both devices.

The invention may facilitate the data exchange between two electronic devices, one or both of which may be a mobile phone, driver information system in the car, portable navigation system, computer, TV, home automation panel, stationary radio, and in-car radio, for example. The invention may make the data exchange between two previously unrelated devices as quick and convenient for the user as possible. Such quickness and convenience may be especially important in time-critical usage scenarios such as in a car, where the focus of the user's attention may need to be on driving.

The invention comprises, in one form thereof, a method of operating first and second electronic devices, including providing the first device with a display screen, and providing the second device with a camera. A tag is displayed on the screen. The tag is associated with information stored within the first device. An image of the tag is captured by use of the camera. The captured image is processed within the second device to thereby recognize the tag. In response to the recognition of the tag, the second device is used to initiate a transfer of the information to the second device.

The invention comprises, in another form thereof, a method of operating first and second electronic devices, including providing the first device with a display screen, and providing the second device with a camera. A tag is displayed on the screen. The tag has encoded therein transfer information needed by the second device in order to obtain content information stored within the first device. An image of the tag is captured by use of the camera. The captured image is processed within the second device to thereby decode the transfer information encoded within the tag. The decoded transfer information is used within the second device in order to initiate a transfer of the content information from the first device to the second device.

The invention comprises, in yet another form thereof, a method of operating first and second electronic devices, including providing the first device with a display screen, and providing the second device with a camera. Navigation information is displayed on the screen. The navigation information includes a tag having encoded therein location information associated with the navigation information. An image of the tag is captured by use of the camera. The captured image is processed within the second device to thereby decode the location information encoded within the tag. The location information is used within the second device in order to present navigation information by use of the second device. The presented navigation information is associated with the location information.

An advantage of the invention is that it requires less interaction with the user than do traditional data transfer technologies. For example, with traditional data transfer technologies the user has to interconnect the two devices, enter authentication information, select the content to be transferred, and then start the data exchange. These steps make the process too long for the quick exchange of information.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
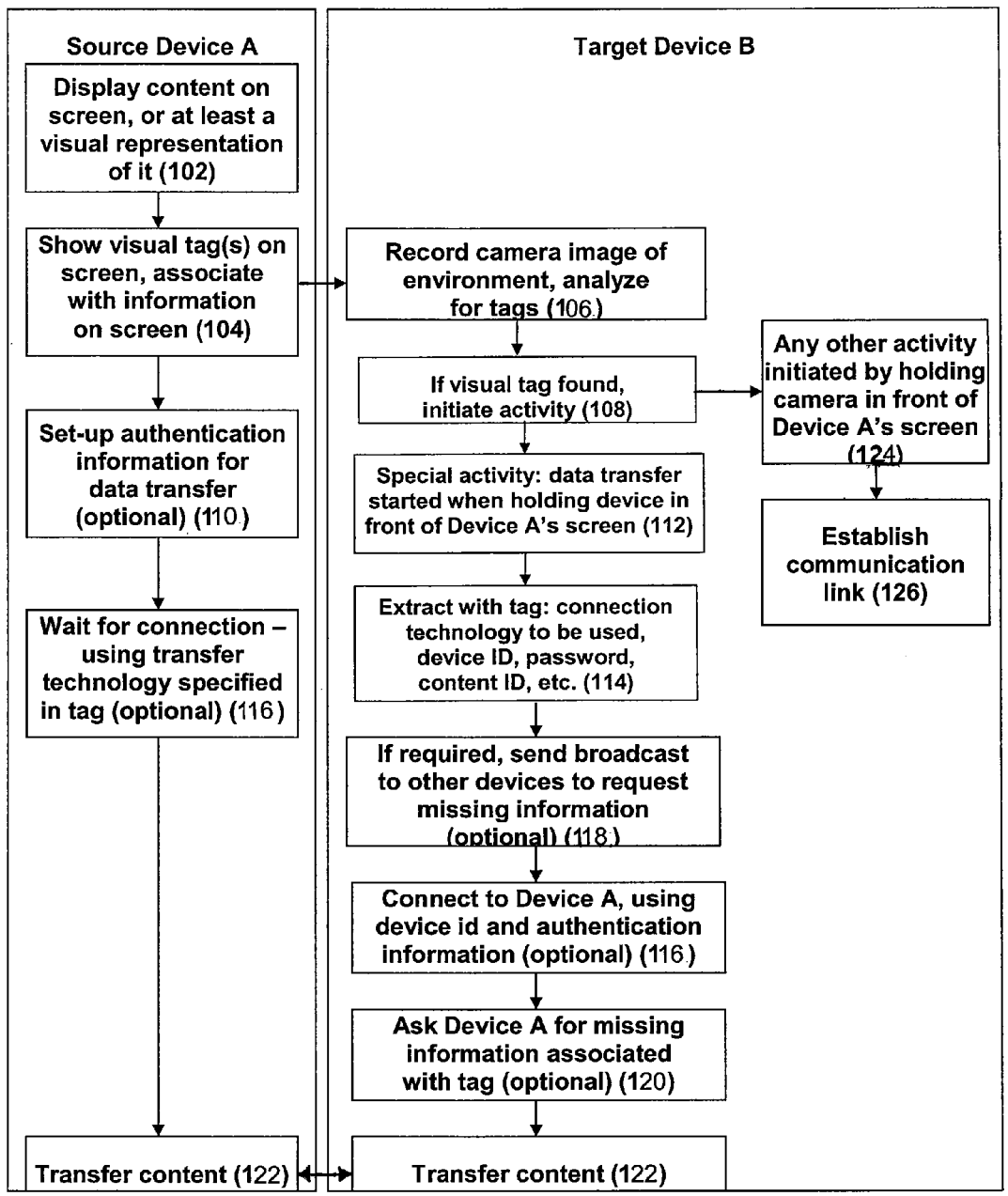
FIG. 1 is a flow chart illustrating one embodiment of a data transfer method of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Referring now to the drawings, and particularly to FIG. 1, there is shown one embodiment of a data exchange method 100 of the present invention in which the data is transferred from a source device A to a target device B. In general, method 100 may include marking content within source device A as being available for data exchange.

Source device A may contain information that needs to be transferred to target device B. In step 102, the information in source device A is currently shown on the display screen of device A. For example, the information may include an address book entry with a postal address and an email address. Alternatively, if the content cannot be shown on the screen, e.g., because it is output as sound on the audio speaker, at least a visual representation of this process is displayed on the screen of Device A, such as done by an mp3 player.

In order to make the information discoverable for other devices, device A may display a "visual tag" somewhere on the screen next to the information or next to the visual representation of the information (step 104). This visual tag can take on several different forms. In a first embodiment, the visual tag is a one- or two-dimensional barcode that marks the device and the information that is shown on the screen as being discoverable. That is, the information may be transmitted to another device. The barcode may also contain additional information about the type of content to be transmitted or about the device, such as a unique address.

In a second embodiment, the visual tag is in the form of a text, containing numbers and/or letters. The information contained in the barcode can also be encoded in plain text and displayed on the screen.

In a third embodiment, the visual tag is in the form of an image that identifies the device on which the tag is displayed as being discoverable, such as a logo or an icon. Compared to the barcode, the image itself transmits less information about the content to be transmitted, but may be more meaningful to the user. For example, the image may resemble an icon depicting a geographical location. If this icon is displayed next to a street address, then the icon marks the content displayed on the screen as being of the type "location".

In a fourth embodiment, the visual tag is in the form of the information itself. If the content displayed on the screen identifies its purpose with significant reliability, no additional tag may need to be shown. For example, due to the structure or format of a street address, it is possible just by reading and analyzing the text for the user to infer that the content shown on, the screen is an address.

More generally, a tag may be in the form of metadata associated with information or content stored and/or display on a device. Such tags may also be commonly referred to as "knowledge tags."

The invention might display only one or multiple tags on the screen of Device A. Instead of displaying the tag dynamically on the screen, it is also possible to statically print the tag on the housing of Device A. In this case, the static tag identifies the device rather than the information on the screen, which is sufficient for usage scenarios that require only recognizing the device.

After a device that is available for data exchange is marked as such, the device is discovered by other devices as being ready for data exchange. Once device A displays a visual tag, device A may be discoverable by device B. Device B may have an optical sensor such as a camera for the discovery, and the camera may be pointed towards device A. As soon as device A's screen is within the field of view of the camera, device B can capture an image of the screen (step 106). This image capturing can be performed by permanently monitoring and recording camera images, or the image capturing can be manually initiated by the user.

Device B may analyze the recorded camera images in order to find visual tags that are shown on the screen of device A. Device B may use a range of approaches to detect the tags. In a first embodiment, the tags are detected by use of barcode decoding technology to find, read and decode one- or two-dimensional barcodes in camera images. An example of such barcode decoding technology is disclosed in U.S. Pat. No. 7,296,747. If a barcode is found and the decoded text contains a valid sequence of information, then device B knows that it has discovered a tag.

In a second embodiment, the tags are detected by use of optical character recognition (OCR) technology to find and read text in camera images. Examples of such OCR technology include OmniPage, Abbyy FineReader, and scanR. If the text can be read and contains a valid sequence of information, then device B knows that it has discovered a tag.

In a third embodiment, the tags are detected by use of image processing technology to detect and recognize objects and shapes in video images, such as state-of-the-art pattern matching approaches. Such object detection technology may enable device B to find known images on the screen of device A. If one of those images is detected, then device B knows it has discovered a tag.

In a fourth embodiment, the tags are detected by use of text analysis technology in order to understand the results of the previous Optical Character Recognition step and to decide whether the read content is of a known type, such as an address. An example of such text analysis technology is disclosed in U.S. patent application Ser. No. 12/354,094, entitled "Location Based System Utilizing Geographical Information from Documents in Natural Language," filed Jan. 15, 2009, and assigned to the assignee of the present application. If the type can be recognized, then device B knows that it has discovered a tag.

Once device B has discovered a tag, device B may recognize the user's intention to exchange data between devices A and B. Detecting this intention may enable the semi-automatic initiation of activities on behalf of the user (step 108). For example, instead of requiring the user to press a button or take another action in order to start an activity, the user may only need to hold device B against, i.e., in engagement with, device A.

The information associated with the visual tag may be used for the below-described processing steps of pairing both of the devices and authorizing a data exchange. After device A is discovered by device B, the data exchange between the two devices may need to be authorized. This step, also called pairing, may ensure that both devices are permitted to exchange data with each other.

State-of-the-art pairing or authentication requires the user to set a password or PIN (personal identification number) for a device that offers information (step 110). Then, the same password may also have to be entered into a second device. The second device may be enabled to access the information on the first device only if the passwords on both devices match. Other embodiments may include variations of this approach. For example, accessing a computer on a network may require a combination of a user name and a password instead of just a simple PIN.

In one embodiment, a visual pairing is performed. That is, all the information that is required to authorize device B to access information on device A may be displayed on the screen of device A. The rationale behind this approach is that if the user positions both devices very close to each other, then it is an indication that the user intends for the devices to exchange information. If device B knows what is displayed on the screen of device A, then the user must have positioned device B very close to device A. Thus, device B should be granted access to the information within device A (step 112).

In order to gain access to the information on device A, device B may use the tag that device B recorded during the discovery phase. The tag or the information associated with the tag may be used to extract a password (step 114). If the tag is a barcode, the password may be the text encoded by the barcode, or at least a portion of that text. If the tag is a visible text on the screen, then the same approach is chosen as is used for barcodes.

If the tag is an image, device B may describe the image to device A during authentication. Alternatively, device B may tell device A what kind of image the tag is. For example, if device A displays an icon depicting a geographical address, then device B may respond during pairing that device B sees an image of the type "address".

If the tag is the content itself, then the same approach may be used as for image tags. For example, if device B detects that device A is displaying an address on the screen, then device B may use the type "address" during authentication.

The type of tag may implicitly, e.g., by convention, or explicitly define the data exchange technology to be used by devices A and B during the subsequent communication steps. Information can be transmitted purely visually/optically or by using traditional transfer technologies, such as Bluetooth, WiFi, or wired networking. For example, if the tag indicates the type "address", then the information is likely small enough to be transmitted quickly using a visual transfer. However, if the content is of type "music", then the data exchange may be performed with a different technology such as Bluetooth or WiFi, which is more appropriate for the relatively large size of the content. Which of the transfer technologies is to be used may be defined by convention and preset in both devices.

If the tag indicates that the data exchange is to be done visually, then the remainder of the pairing step may be skipped. The remainder of the pairing step may not be needed since the act of capturing an image of the screen of device A by use of the camera of device B may be considered to be sufficient authorization for device B to receive the information in device A. That is, if device B can capture an image of the screen of device A, then it is assumed that the user intentionally placed device B in close proximity to device A for the purpose of receiving device A's information.

In all other cases, device A may prepare itself to be contacted using the data exchange technology encoded by the tag. Device A may set up the authentication information in relation to what is currently displayed on the screen of device A (step 110). If the tag has enough room for a password, as is possible for tags in the form of barcodes or text, this password may be set to authorize the connection and may be embedded into the tag. However, if the tag has only enough space in which to encode a type, as is the case with the image or content tags, then a password or PIN may be used that is associated with the encoded type.

After analyzing the visual tag and its type, device B may be able to determine which data exchange technology is required to communicate with device A (step 114). Device B may then contact device A with that technology and, for example, build up a Bluetooth connection with device A. All the information necessary to establish the connection may be encoded in the tag. For example, the Bluetooth address of device A may be encoded in the tag.

Once the connection between device B and device A is established (step 116), device B may send the authentication information encoded in the tag or the tag type as explained previously. For example, device B may automatically enter the PIN required for the Bluetooth connection.

Not all the tags have enough room to encode the address of device A. In cases where tags encode only a type, an additional step maybe employed to identify device A without knowing its address. This may call for networking technologies that support broadcasting information to all devices in the same network or in the same vicinity. Using broadcasting, device B may be able to query all devices within range to check if the devices fulfill specific requirements (step 118). For example, device B may broadcast into the network and announce that it (i.e., device B) is looking for the device that is currently displaying an "address" on its screen. This request may then be answered by device A, which in response may send its unique address to device B.

Once the pairing has finished, devices A and B may be able to perform an exchange of data with each other. One of two different approaches may be taken to realize the data exchange. In a first such approach, if the tag on device A's screen indicates that the data transfer is to be performed using traditional wireless or wired transmission technologies, then the connection may be established during the pairing step. The data exchange step may then make use of this established connection. During this step, device B may request a transfer of the information that is represented on the screen of device A and which is identified by the tag.

Depending on the type of tag, device B may be able to uniquely address the content it would like to receive. If the tag is a barcode, then it is possible for the name and location of the digital file that is currently output by device A to be encoded in the barcode. The same is possible for text-based tags. That is, if the tag is text, then it is possible for the name and location of the digital file that is currently output by device A to be identified in the text. Then, device B can directly access the file from the file's original location, regardless of whether the file's original location is within device A's internal storage or outside device A on a server.

The other two types of tags may not be able to uniquely identify the content, but rather can only indicate the content type. In this case, device B may use a different, context-based strategy to request the content. Device B may ask device A for an identification of the content that is associated with the tag currently shown on device A's screen. For example, if a tag for type "music" is displayed on device A's screen, then device B may request the name and location of the song that is currently being played by device A (step 120). Device A may respond with the unique location identifier of the song, which device B may use to access and copy the song (step 122).

Alternatively, depending on the content, device A might also send the content directly in response to device B's request. For example, if device B asks device A for the "business card" that is currently displayed on the screen of device A, then device A may return the content of the "business card" directly, by a method that is supported by the transfer technology. For example, Bluetooth supports a profile for transmitting address book information. This profile may be used to send the information from device A back to device B in response to the request from device B for the business card that is displayed on device A's screen. This approach illustrates how the existing Bluetooth Object Push Profile associated with a sending device may be extended with an option to visually "pull" information from that device.

If the tag on Device A's screen indicates that the data transfer is to be done visually, then a different approach may be chosen. In this approach, all the content to be transmitted from device A to device B may be encoded on the screen of device A, and device B may use its camera to read the content on device A's screen. For this purpose, device B may interpret the information received during the earlier discovery step as the content. That is, the tag type and the information encoded in the tag may be considered to be the content. For example, the content encoded in the barcode can be a geographical location which may then be stored by device B. Similarly, the image used by an image tag may be identified and stored by device B.

Depending on the tag type, the amount of content that can be transferred between the two devices may be limited. In order to increase the amount of content that can be transferred between the two devices, device A may use animated tags. Thus, a sequence of different individual tags may be displayed on the screen of device A. This sequence of different tags may be repeated regularly in order to allow device B to read the entire content of the tags. In addition, the first tag of the sequence may be marked so as to indicate to device B when to start reading the content, which may include capturing a respective image of each of the individual tags. Depending on the tag type, this marker may be a special barcode, text or image.

The invention is not limited to visually transferring content only from device A to device B. If devices A and B are each equipped with a camera, content can be bi-directionally transferred (i.e., transferred in both directions) at the same time. In this approach, each device may have a camera mounted on the same side of the device's housing as the screen. This makes it possible for both devices to read the other device's screen using the approach described herein.

It is also possible for the two cameras of the devices to simultaneously face the screen of the other device without each device having a camera and screen on the same side of the housing. For example, two mobile devices may each have two sections that can be oriented at a right-angle relative to each other, as with a flip or clamshell form factor (i.e., in which a device has two or more sections that fold via a hinge). More particularly, one device may have its camera and screen on different sections, but with both the camera and screen facing toward the right-angle. The other device may also have its camera and screen on different sections, but with both the camera and screen facing away from the right-angle. Thus, by placing the two devices in a "nesting" configuration, the camera of each device may face the screen of the other device.

In response to each device recognizing the tag of the other device, each device may initiate a transfer of the information stored within the other device to the recognizing device. Each of the steps by each device may be performed automatically and substantially simultaneously with the corresponding step of the other device. The two devices may remain substantially stationary throughout each of the above-described steps.

In response to device B's camera being held up to device A's screen such that a visual tag is found, other activities besides data transfer may be initiated (step 124). Such other activities may include establishing a communication link, or a communication format, between devices A and B, for example.

Figure 2:
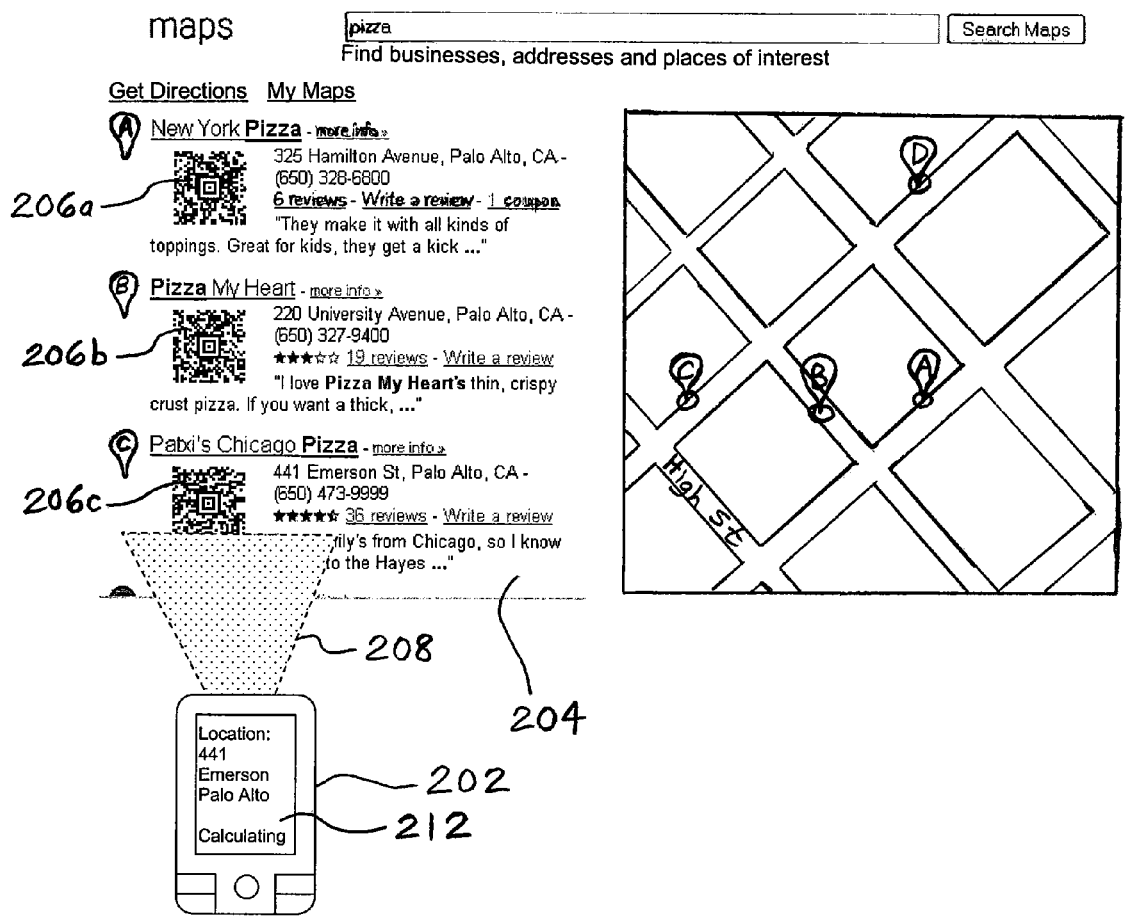
FIG. 2 is an illustration of the transfer of navigation information from a screen of a computer to a mobile device according to one embodiment of the present invention.

In one example embodiment of how the invention may be used, a geographical location may be transmitted from one device to another after trip planning. In a specific embodiment, trip planning may involve two devices in the form of an internet-connected computer and a mobile navigation system 202 (FIG. 2). Because an internet-connected computer typically has a bigger screen 204, keyboard and mouse than does a mobile navigation system, it may be assumed to be much easier for a user to plan a trip with the internet-connected computer than with mobile navigation system 202. Once the user finds his travel destination on the internet-connected computer screen 204, the travel destination also needs to be entered into mobile navigation system 202.

Tags 206*a-c*, such as barcodes, may be used to encode the location. Instead of the user being required to print out barcodes and attach them to a physical object, according to the invention, the barcodes may be temporarily displayed on the screen for the purpose of data exchange. In one embodiment, barcodes are added to web pages, and the barcodes contain addresses or other location information. In order to transmit the location information from the internet-connected computer to the mobile navigation system, the user may hold the mobile navigation system device 202 in front of the screen 204 of the computer such that a tag 206 is within a field-of-view 208 of a camera of mobile device 202. The user may then use the camera of mobile navigation system device 202 to take a picture of the tag 206 on the screen. Finally, the mobile device 202 may decode the tag, extract the geographical location, and communicate the geographical location to the navigation system.

If it is possible for each of tags 206a-c to simultaneous fit into the field-of view 208 of the camera at once, then the camera may need to capture only a single image of screen 204. However, it is possible for the user to find only tag 206a within the camera's view finder, capture an image of only tag 206a, move the device 202 down the screen 204 such that only tag 206b is found within the camera's view finder, capture an image of only tag 206b, etc. The information within each of the discrete captured images may then be compiled within device 202.

The method of the invention as described above has advantages over other existing approaches. For example, the inventive method may be more convenient and faster than manually retyping the address displayed on the computer screen into the mobile navigation system. Another advantage is that the invention does not require any data exchange software to be installed on the computer. Yet another advantage is that the invention works without an internet or cell phone connection to the mobile device.

Figure 3:
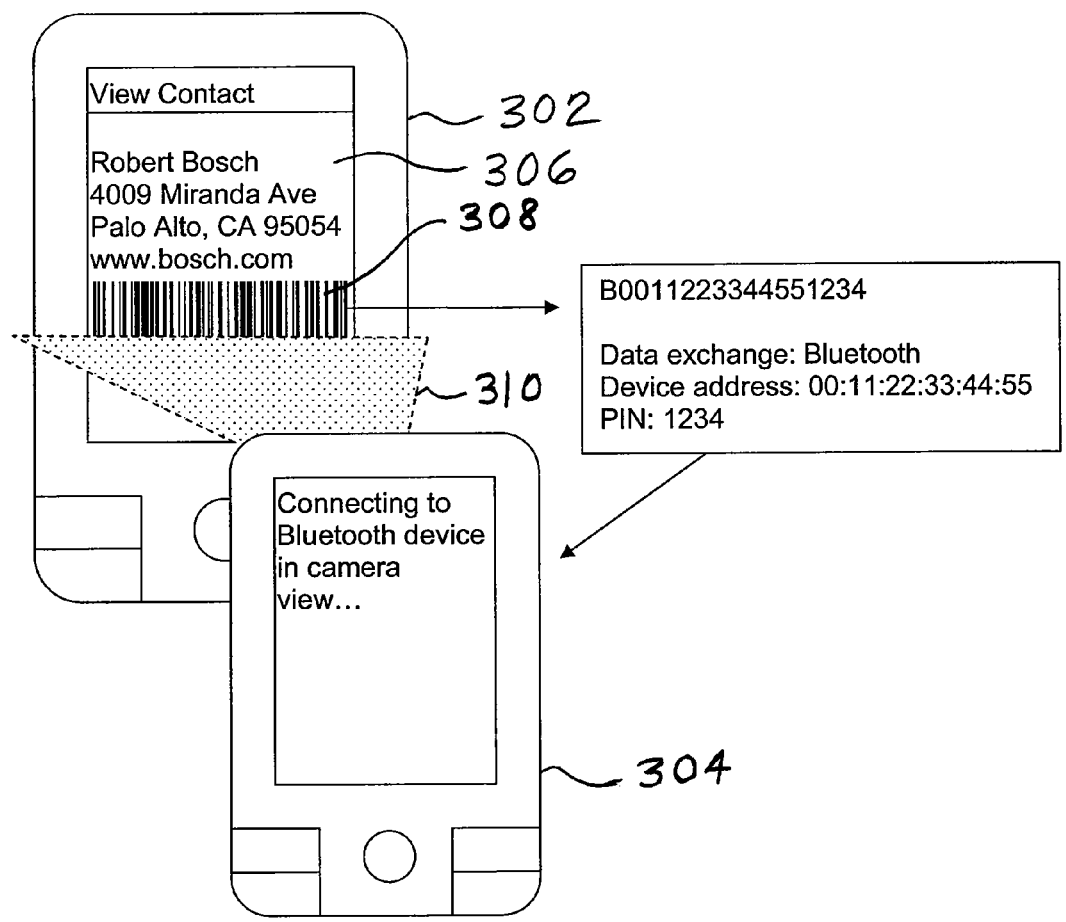
FIG. 3 is an illustration of the pairing of two Bluetooth mobile devices by use of a camera according to another embodiment of the present invention.

Illustrated in FIG. 3 is another example embodiment of how the invention may be used in pairing of two Bluetooth mobile devices 302, 304 by use of a camera on device 304. Assume that a user of device 302 wants to transfer a business card from device 302 to device 304. The user may select the business card on device 302 and display the selected business card on a screen 306 of device 304. Next to the business card information on screen 306 there may be a small barcode 308. This barcode 308 may mark the information on screen 306 to be "discoverable" by other devices such as device 304.

The user of device 304, who may also be the user of device 302 or a different user, may point the camera of mobile phone 304 at the display screen 306 of device 302 such that at least barcode 308 is within a field-of-view 310 of the camera. The camera may continuously capture a sequence of images, and a processor within device 304 may analyze the content of the images. As soon as the camera finds the barcode 308 on the screen of device 302, the processor of device 304 may extract the information contained within barcode 308. In the example illustrated in FIG. 3, the information contained within barcode 308 is the string of characters "B0011223344551234," wherein "B" designates Bluetooth as the transfer technology, "001122334455" designates the Bluetooth address of device 302, and "1234" designates the personal identification number (PIN) used to gain access or authorization.

Device 302 may have Bluetooth discovery disabled for security reasons. However, since device 304 now knows the Bluetooth address of device 302, device 304 can communicate with device 302 despite device 302 having Bluetooth discovery disabled. Thus, device 304 may start the pairing process with device 302. This pairing process may include entering the same PIN number into both devices 302, 304. Device 302 may automatically decide on, i.e., select, a PIN number to be used for pairing. Device 302 may make this PIN known to device 304 by including the PIN in the barcode 308. Since the user of device 304 points his camera at the screen 306 of device 302, device 304 may see that information and extract the PIN from the barcode 308. Now that both devices 302, 304 know the correct PIN, devices 302, 304 can authenticate each other. The data exchange of the business card from device 302 to device 304 may then be performed using the standard Bluetooth object push protocol. In contrast to the traditional Bluetooth pairing and transfer of business cards, the inventive method does not require any input from either of the users of devices 302, 304 in order to perform the data exchange. Rather, the user or users of devices 302, 304 need only point the camera of device 304 towards the screen 306 of device 302.

Figure 4:
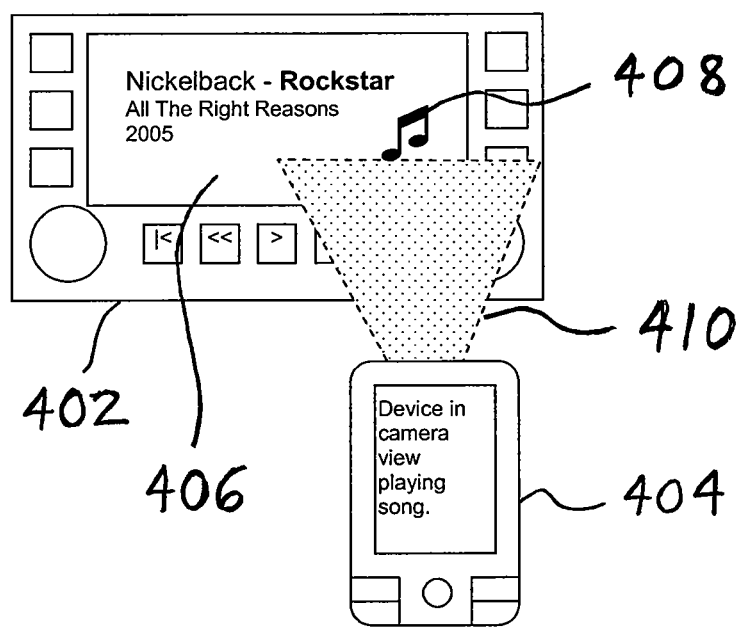
FIG. 4 is an illustration of a song that is played on an entertainment system being transferred to a mobile mp3 player by use of a camera according to yet another embodiment of the present invention.

Illustrated in FIG. 4 is yet another example embodiment of how the invention may be used in transmitting music from an entertainment system 402 that is playing a song to a mobile mp3 device 404. On a display screen 406 next to the song name an icon image 408 may be displayed which depicts that a song is being played on device 402. Assume that the user wants to transfer the song playing on system 402 to his mobile mp3 player 404. The mp3 player 404 has a built-in camera. The user may point the camera towards the screen 406 of the entertainment system 402 such that icon image 408 is within a field-of-view 410 of the camera, as indicated by a view finder of the camera. The mp3 player 404 may find the song depiction 408 in the image captured by the camera, and thus the mp3 player 404 may recognize the user's intention to transfer a song from system 402 to player 404.

Because the song icon 408 does not contain an identification of the device 402, the mp3 device 404 may use a broadcast approach to find device 402. Using its built-in WiFi radio, mp3 player 404 may send a broadcast message that may be received by all devices within the WiFi network range. The broadcast message may ask which device that receives the broadcast message is currently playing a "song". The entertainment system 402 answers or responds to this request with the WiFi address of entertainment system 402. The answer or response from entertainment system 402 may also include the name and location of the song that is currently playing. Alternatively, after receiving the WiFi address of entertainment system 402, player 404 may ask system 402 for any missing information that player 404 needs and that may be associated with song icon 408, such as the name and location of the song that is currently playing. The mp3 player 404 may use this information to locate and copy the file from system 402 into an internal memory of player 404. Similar to the embodiments of FIGS. 2 and 3, the user may only need to point the camera of his mp3 player 404 at the screen of the other device 402 in order to copy the content from device 402, which is a very easy and convenient process for the user to undertake.

The invention may include several novel features that are not disclosed in the prior art. A first such novel feature may be that the interaction (e.g., data exchange) between two electronic devices may be initiated by merely holding one of the devices such that the camera of the device faces a display element of the other device. Thus, no manual steps such as pressing pushbuttons or keying in text information may be required of the user. This leads to a second novel feature in that a user can transfer or copy content that he sees on one device to the other device by merely pointing the camera of one device toward a display element of the other device, which is very quick and convenient for the user.

A third novel feature of the invention is that all information required to initiate, authenticate and perform the data exchange may be encoded on the display screen of one device and may be recorded by use of the other device's camera. A fourth novel feature is that all such required information may be encoded in visual tags on the display screen, wherein the visual tags may include barcode, texts, images, or the content itself.

A fifth novel feature of the invention is that tags may be detected by use of image processing of the recorded camera image. For example, the image processing may include optical character recognition in order to read text, or bar code scanning capabilities.

A sixth novel feature of the invention is that bar codes may be provided on the computer screen by route planning software (such as browser-based Google Maps) to wirelessly transmit location information to a portable navigation system or cell phone with a built in camera. In one embodiment, the camera of the navigation system or cell phone can capture an image of the bar code on the computer screen, and a processor in the navigation system or cell phone can extract the location information from the image of the bar code. Thus, the method of the invention may be more convenient and faster than manually retyping an address. Moreover, the method of the invention may not call for any data exchange software to be installed on the computer or other information-sending device. Lastly, the method may work without an internet or cell phone connection to the information-receiving device. No wires or cables whatsoever may need to be connected to the information-receiving device.

A seventh novel feature of the invention is that it may employ a data exchange that is purely visual and that thus requires no additional hardware beyond an existing camera for the data exchange. Nor does the inventive method require any additional steps such as pairing of devices in Bluetooth. However, another novel feature is that the inventive method may employ visual pairing and/or authentication that can be combined with traditional data exchange technologies such as Bluetooth.

In one embodiment, a system of the invention may include two devices (e.g., computer, navigation system, radio, mobile phone, etc.) at least one of which has a display screen and at least the other of which has a camera. An inventive method may include displaying visual tags on the screen, recording the tags with the camera of the other device, and performing image analysis to detect and classify the tags. The event of detecting a tag may be used to initiate an activity on behalf of the user. Thus, the traditional activity of pressing a pushbutton to initiate an activity may be replaced with the inventive activity of holding the camera in front of the tag.

In another embodiment, when a visual tag on a first device is detected by a second device, activity is initiated that may result in data being bi-directionally transferred between the two devices. For example, the cameras of the two devices may simultaneously face the respective screen of the opposite device. Thus, the two cameras of the two devices may simultaneously receive information from the screen that the camera is facing.

In yet another embodiment, a visual tag can be in the form of either a barcode, a text encoding, an image or the content itself (i.e., if the meaning of the content can be discerned merely by looking at the content). In a further embodiment, one or several such visual tags may be used at the same time.

In a further embodiment, a visual tag may include an encoded identification of the technology that is to be used for the actual data transfer. For example, the visual tag may have an encoded identification of Bluetooth, WiFi, purely visual by use of camera, etc., as the technology that the target device should expect for the upcoming data transfer.

In still another embodiment, visual pairing is used to transmit information that is needed for pairing and authentication purposes and/or is called for by the chosen data transfer technology. Such transmitted information may include an identification of a device, a device address, and/or authorization information, such as a password and/or a user name. The first device may set itself up to accept connections using the specified transfer technology and the specified parameters. The second device may use that information to automatically connect and authenticate itself with the first device.

Another embodiment involves a specific use case. Namely, the visual pairing may be used for establishing connections between Bluetooth devices. Thus, the standard Bluetooth pairing method may be replaced with a visual pairing method of the invention.

In yet another embodiment, visual tags may be used to encode an identification of the content to be transferred. Using this content identification, one device can visually indicate what content the device is currently outputting (e.g., what content is being displayed on the screen or what content is being audibly played on the speaker). For example, the visual tag may indicate a street address that navigation information on the screen pertains to. Or the visual tag may indicate a name of a song that is being played on an audio speaker. Another device may read the visual tag, decode the content identification, and automatically access or copy that identified content.

In a further embodiment, visual tags may be used to encode the actual content and transfer the encoded actual content visually. The visual tag may be displayed by a first device and read by a second device. Within the second device, the encoded actual content may be decoded and used for further purposes. Animated tags may be used in order to increase the amount of data that is being transferred between the two devices.

In a specific use case, a barcode is displayed on the screen of one device, wherein the barcode encodes a geographical position or address. The barcode may be read by a second device, and the second device may decode the location in the barcode and use the location for navigation purposes. In an even more specific use case, the barcodes may be displayed in webpages along with address lists.

In another specific use case, music that is currently being played on a first device is transmitted to a second device. A barcode identifying the music file may be displayed on a screen of the first device. After visually reading the barcode, the second device may then access the content identified by the barcode and copy the content. In an alternative embodiment, instead of a barcode being displayed, a specific icon is displayed on the first device. The second device visually recognizes the icon as an indication that music is being playing on the first device. The second device may then ask the first device for an identification of the song that is being played. After receiving the identification, the second device may be able to access that particular song within its own memory or on-line, for example.

Figure 5:
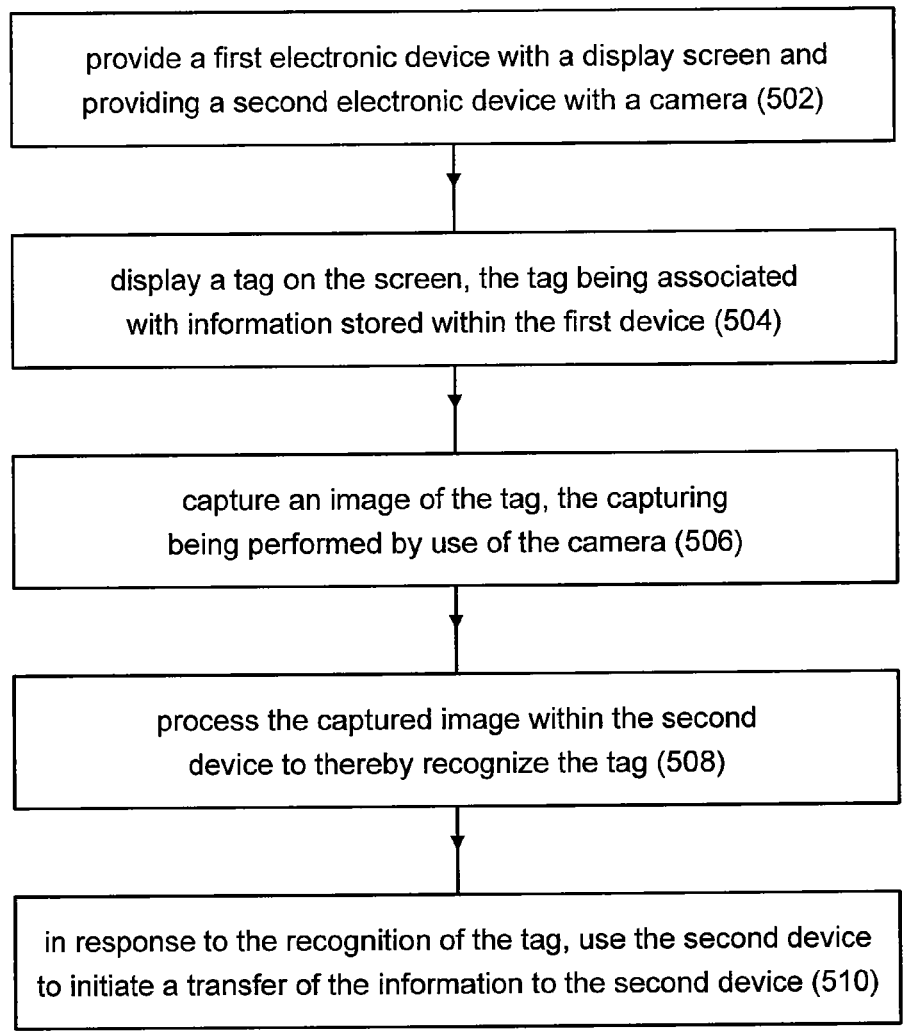
FIG. 5 is a flow chart illustrating one embodiment of a method of operating first and second electronic devices according to the present invention.

One embodiment of a method 500 of the present invention for operating first and second electronic devices is illustrated in FIG. 5. In a first step 502, a first electronic device is provided with a display screen and a second electronic device is provided with a camera. For example, in the embodiment of FIG. 4, a first electronic device in the form of an entertainment system 402 is provided with a display screen 406, and a second electronic device in the form of a mobile mp3 device 404 is provided with a camera. The camera may be similar to cameras that are commonly provided on mobile telephones.

In a next step 504, a tag is displayed on the screen. The tag is associated with information stored within the first device. For example, a tag in the form of a music icon 408 may be displayed on screen 406. Music icon 408 may be indicative of the fact that music is currently being played on entertainment system 402. Thereby, music icon 408 may be associated with a song currently playing on entertainment system 402. More particularly, music icon 408 may be associated with both an identity of the song as well as audio data of the song, both of which may be stored within entertainment system 402.

Next, in step 506, an image of the tag is captured by use of the second device's camera. For example, an image of music icon 408 may be captured by the camera of mp3 device 404.

More specifically, a user of mp3 device 404 may hold mp3 device 404 such that music icon 408 is within the field-of-view 410 of the camera of mp3 device 404. In one embodiment, the user may need to take some action in order to initiate the capturing of an image by the camera, such as by pressing a pushbutton on mp3 device 404. However, in other embodiments, such image capturing occurs automatically without any further user input.

In step 508, the captured image is processed within the second device to thereby recognize the tag. For example, mp3 device 404 may include a processor running image recognition software. The software may analyze the image on a pixel-by-pixel basis to thereby recognize music icon 408. The software may include code that pre-programs mp3 device 404 to recognize music icon 408 in particular.

In a final step 510, in response to the recognition of the tag, the second device is used to initiate a transfer of the information to the second device. Music icon 408 may not contain an identification of device 402, so mp3 device 404 may broadcast a message signal, such as with a WiFi radio, asking device 402 to identify itself as the device that is currently playing a "song". Entertainment system 402 may answer this request with the WiFi address of entertainment system 402, as well as the name and storage location of the song that is currently playing. The mp3 player 404 may use this information to locate the song within device 402 and copy the music file into an internal memory of player 404. In another embodiment, player 404 orders a copy of the song from an on-line internet music service rather than receiving the song from device 402.

Figure 6:
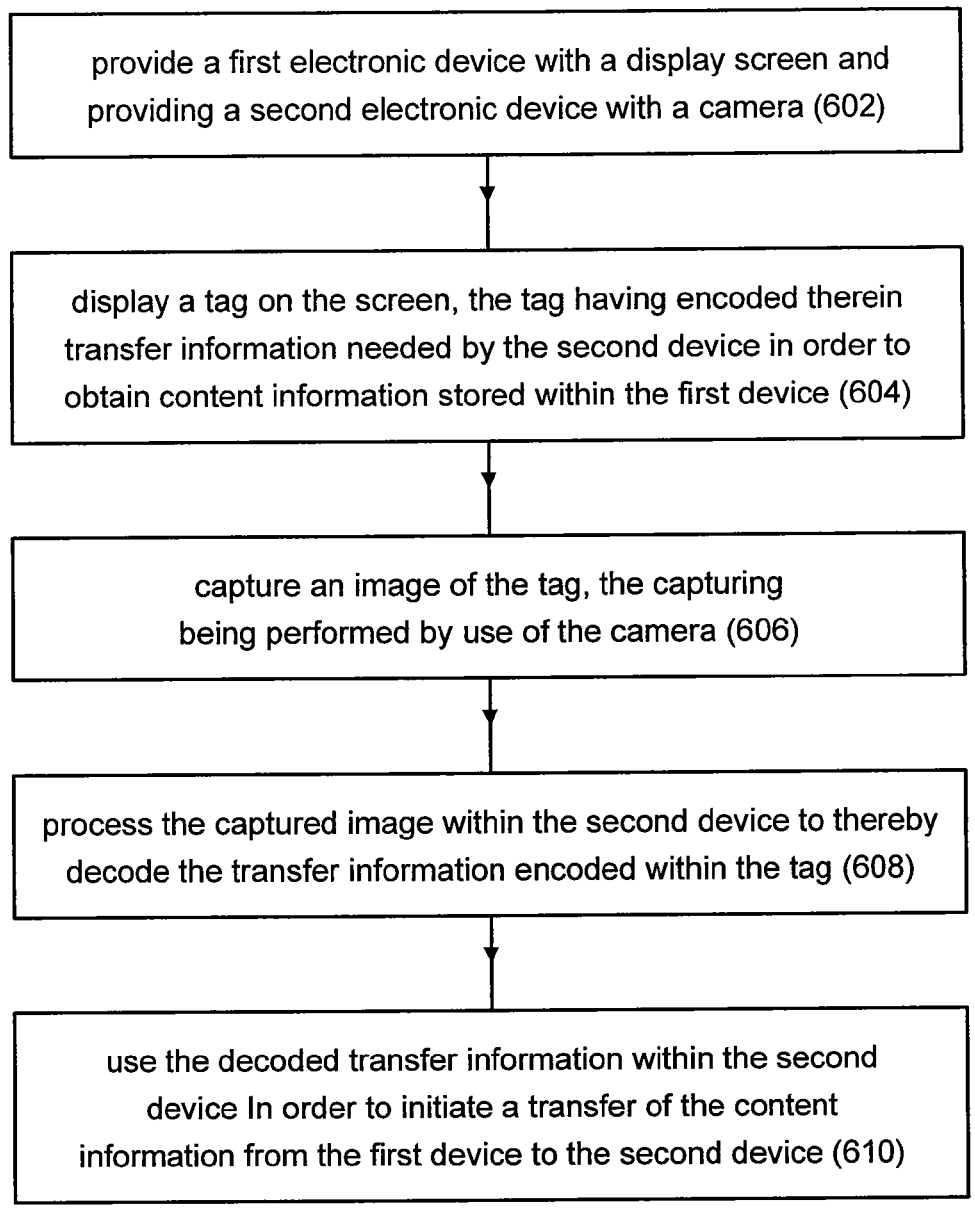
FIG. 6 is a flow chart illustrating another embodiment of a method of operating first and second electronic devices according to the present invention.

Yet another embodiment of a method 600 of the present invention for operating first and second electronic devices is illustrated in FIG. 6. In a first step 602, a first electronic device is provided with a display screen and a second electronic device is provided with a camera. For example, in the embodiment of FIG. 3, a first electronic device in the form of a Bluetooth mobile device 302 is provided with a display screen 306, and a second electronic device in the form of another Bluetooth mobile device 304 is provided with a camera. The structure of the camera as well as its operation may be similar to cameras that are commonly provided on mobile telephones.

In a next step 604, a tag is displayed on the screen. The tag has transfer information encoded therein. The transfer information may be needed by the second device in order to obtain content information that is electronically stored within the first device. For example, a tag in the form of a barcode 308 may be displayed on screen 306 of device 302. In the example shown in FIG. 3, the transfer information "B0011223344551234" is encoded within barcode 308. The transfer information includes an identification of a technology ("B" for Bluetooth) needed by device 304 to receive content from device 302; a device address (00:11:22:33:44:55) of device 302 that may need to be used by device 304; and a password or "PIN" ("1234") that must be provided by device 304 to device 302 before device 302 will provide content information that is stored within memory of device 302.

Next, in step 606, an image of the tag is captured by use of the second device's camera. For example, an image of barcode 308 may be captured by the camera of device 304. More specifically, a user of device 304 may hold device 304 such that the camera of device 304 is pointed at screen 306. The user then may use a view finder of device 304 or the equivalent of a view finder in order to verify that barcode 308, or at least a portion thereof, is within field-of-view 310 of the camera of device 304. If only a portion of barcode 308 fits within field-of-view 310 with sufficient focus that barcode 308 can be read, then the user may need to scan the camera across barcode 308. Although it is possible for the camera to operate automatically when encountering a barcode, in one embodiment, the user may press a pushbutton or provide a voice command to cause the camera on device 404 to capture an image.

In step 608, the captured image is processed within the second device to thereby decode the transfer information encoded within the tag. For example, device 304 may include a processor that runs software for reading barcodes. The software may analyze the image on a pixel-by-pixel basis to thereby discern the thickness of the individual bars in barcode 308 and thereby determine the code that is encoded within barcode 308.

In a final step 610, the decoded transfer information is used within the second device in order to initiate a transfer of the content information from the first device to the second device. In the example embodiment of FIG. 3, since device 304 decoded the Bluetooth address and PIN number of device 302 within barcode 308, device 304 can communicate with device 302 and start the pairing process with device 302. This pairing process may include entering the same PIN number into both devices 302, 304. Since both devices 302, 304 know the correct PIN, devices 302, 304 can authenticate each other. The data exchange of the business card information from device 302 to device 304 may then be performed using the standard Bluetooth object push protocol.

By analyzing the transferred content information (e.g., the business card information), device 304 may recognize the format of the content as that of business card information. Based on this recognition, device 304 may open an application which stores and organizes such business card information. More generally, the second device may identify and open an application that is able to best make use of the particular transferred content information.

Figure 7:
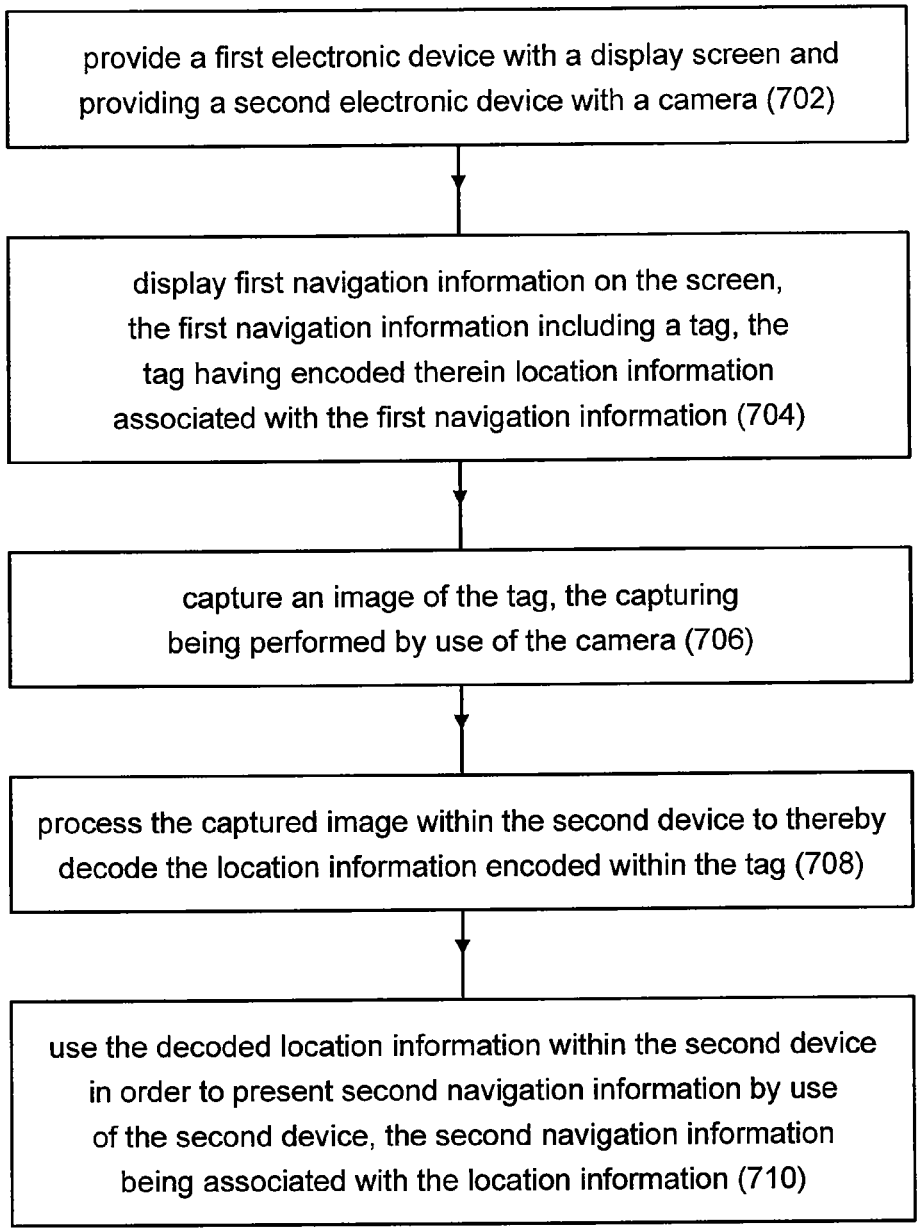
FIG. 7 is a flow chart illustrating yet another embodiment of a method of operating first and second electronic devices according to the present invention.

Yet another embodiment of a method 700 of the present invention for operating first and second electronic devices is illustrated in FIG. 7. In a first step 702, a first electronic device is provided with a display screen and a second electronic device is provided with a camera. For example, in the embodiment of FIG. 2, a first electronic device in the form of a computer that is connected to the Internet is provided with a display screen 204, and a second electronic device in the form of a mobile navigation system 202 is provided with a camera. In the embodiment illustrated in FIG. 2, similarly to the embodiments of FIGS. 3 and 4, the lens of the camera is on a side of navigation system 202 that is opposite a display screen 212 of navigation system 202.

In a second step 704, first navigation information is displayed on the screen. The first navigation information includes a tag having encoded therein location information associated with the first navigation information. In the example embodiment of FIG. 2, navigation information in the form of tags 206a-c, restaurant names and addresses, restaurant reviews, and a map showing the locations of the restaurants is displayed on a screen 204. Each of tags 206a-c has encoded therein location information, such as a restaurant name, address and/or geographic coordinates (e.g., latitude and longitude) of the location of the respective restaurant. The location information within tags 206a-c may also include the geographic coordinates of a present location of the user and/or a starting location of the user on which the turn-by-turn directions may be based.

In a next step 706, an image of the tag is captured by use of the second device's camera. For example, a respective image of each of tags 206a-c may be captured by the camera of device 202. More specifically, a user of device 202 may hold device 202 such that the camera of device 202 is pointed at one of tags 206a. The user then may use a view finder of device 202 or the equivalent of a view finder in order to verify that the tag, or at least a portion thereof, is within field-of-view 208 of the camera of device 202. If only a portion of the tag fits within field-of-view 208 with enough focus that the tag can be read, then the user may need to scan the camera across the tag. However, it is also possible within the scope of the invention for the camera to capture a single image that includes each of tags 206a-c. Although it is possible for the camera to operate automatically when encountering the tags, in one embodiment, the user may press a pushbutton or provide a voice command to cause the camera on device 202 to capture an image or a sequence of images.

Next, in step 708, the captured image is processed within the second device to thereby decode the transfer information encoded within the tag. For example, device 202 may include a processor that runs software for decoding the particular format in which tags 206a-c are provided. The software may search for and/or measure the dimensions of particular patterns in the tags, wherein the patterns are predetermined and known by both the first device and the second device. By thus analyzing the tags, device 202 may determine the location codes (e.g., geographical coordinates) that are encoded within tags 206a-c.

In a final step 710, the decoded location information is used within the second device in order to present second navigation information by use of the second device. The second navigation information may be associated with the location information. In the example embodiment of FIG. 2, device 202 may input the decoded location information into its own navigation system. The navigation system of device 202 may be internal or may be wirelessly accessed via the Internet, for example. The navigation system of device 202 may use the decoded location information to display its own graphical map, text restaurant addresses, text restaurant reviews, and/or text turn-by-turn directions, for example. Alternatively, or in addition, such second navigation information may be presented audibly on an audio speaker of device 202.

The presentation of the second navigation information may be based on other information in addition to the location information from tags 206a-c. For example, device 202 may calculate the graphical map and text turn-by-turn directions based in part on the user's present geographical coordinates, as ascertained by a global positioning system (GPS) associated with device 202.

The invention has been described above in some embodiments as including only a one way transfer of information from one device to another. However, the invention may be equally applicable to a two way transfer of information between two devices.

While this invention has been described as having an exemplary design, the present invention may be further modified within the spirit and scope of this disclosure. This application is therefore intended to cover any variations, uses, or adaptations of the invention using its general principles.

What is claimed is:

1. A method of operating first and second electronic devices, the method comprising the steps of:
    providing the first device with a display screen;
    providing the second device with a camera;
    displaying a tag on the screen, the tag being associated with information stored within the first device, the tag comprising an icon indicating that music is currently playing on the first device;
    capturing an image of the tag, the capturing being performed by use of the camera;
    processing the captured image within the second device to thereby recognize the tag; and
    in response to the recognition of the tag, using the second device to initiate a transfer of the information to the second device.

2. The method of claim 1 comprising the further steps of:
    selecting an application for the second electronic device, the selecting being dependent upon the recognizing of the tag; and
    using the transferred information within the selected application in the second device.

3. The method of claim 1 wherein the information is transferred from the first device to the second device.

4. The method of claim 1 wherein the transfer of the information to the second device comprises the second device obtaining the information via the Internet from an other source of the information.

5. The method of claim 1 wherein the using the second device to initiate a transfer of the information to the second device comprises using the second device to request from the first device an identity of the information.

6. The method of claim 1 wherein the using the second device to initiate a transfer of the information to the second device comprises using the second device to establish a communication link with the first device according to transfer information within the tag.

7. The method of claim 1 wherein the using the second device to initiate a transfer of the information to the second device comprises using the second device to request from the first device missing information associated with the tag.

8. The method of claim 1 comprising the further steps of:
    displaying a second tag on a display screen of the second device, the second tag being associated with information stored within the second device;
    capturing an image of the second tag, the capturing of the image of the second tag being performed by use of a camera on the first device;
    processing the captured image of the second tag within the first device to thereby recognize the second tag; and
    in response to the recognition of the second tag, using the first device to initiate a transfer of the information stored within the second device to the first device, wherein each of the displaying, capturing, processing, and initiating steps by both of the devices are performed automatically and substantially simultaneously by the first and second devices, the first and second devices remaining substantially stationary throughout each of the displaying, capturing, processing, and initiating steps by both of the devices.

9. The method of claim 1 wherein the tag comprises a barcode identifying a music file associated with the music currently playing on the first device, in response to the recognition of the barcode, the second device obtaining a copy of the music file.

10. The method of claim 1 wherein, in response to the recognition of the icon, the second device requests from the first device an identification of the music currently playing on the first device, and, in response to receiving the identification, the second device obtains a copy of the identified music.

11. The method of claim 1 wherein the tag includes authorization information needed in order to gain access to the music that is currently playing on the first device.

12. A method of operating first and second electronic devices, the method comprising the steps of:

providing the first device with a display screen;
providing the second device with a camera;
displaying a tag on the screen, the tag having encoded therein transfer information needed by the second device in order to obtain content information stored within the first device, the transfer information including authorization information needed in order to gain access to the content information;
capturing an image of the tag, the capturing being performed by use of the camera;
processing the captured image within the second device to thereby decode the transfer information encoded within the tag; and
using the decoded transfer information within the second device in order to initiate a transfer of the content information from the first device to the second device.

13. The method of claim 11 wherein the transfer information includes at least one of:
an identification of a technology needed to transfer the content information from the first device to the second device;
an identification of the first device; and
a network address of the first device.

14. The method of claim 11 wherein the second device automatically initiates the transfer of the content information from the first device to the second device in response to decoding the transfer information encoded within the tag.

15. The method of claim 11 wherein the tag comprises a barcode, a text, a pattern, or encoded said content information.

16. The method of claim 11 comprising the further steps of:
analyzing the transferred content information in order to determine an activity being performed by a user; and
selecting an application for the second electronic device, the selecting being dependent upon the determined activity being performed by the user.

17. The method of claim 11 wherein the initiating a transfer of the content information to the second device comprises using the second device to establish a communication link with the first device according to the transfer information encoded within the tag.

18. The method of claim 11 wherein the first electronic device comprises a first Bluetooth device, and the second electronic device comprises a second Bluetooth device, the method replacing a standard Bluetooth pairing process between the first and second electronic devices.

19. A method of operating first and second electronic devices, the method comprising the steps of:
providing the first device with a display screen;
providing the second device with a camera;
displaying a tag on the screen, the tag comprising an icon indicating that music is currently playing on the first device;
capturing an image of the tag, the capturing being performed by use of the camera;
processing the captured image within the second device to thereby recognize the tag;
in response to the recognition of the tag, using the second device to broadcast a message signal asking the first device to identify itself as a device that is currently playing music; and
in response to the message signal, using the first device to provide an address of the first device and a storage location of the music that the first device is currently playing.

20. The method of claim 19 wherein the storage location is within the first device.

21. The method of claim 20 comprising the further step of using the second device to locate within the first device the music that the first device is currently playing.

22. The method of claim 21 comprising the further step of using the second device to copy the music that the first device is currently playing into an internal memory of the second device.

23. The method of claim 19 comprising the further step of using the second device to order a copy of the music that the first device is currently playing from an on-line internet music service.

24. The method of claim 19 comprising the further step of using the second device to establish a communication link with the first device according to transfer information within the tag.

25. The method of claim 11 wherein the transfer information includes authorization information needed in order to gain access to the music that the first device is currently playing.

* * * * *